United States Patent [19]
Weinhold et al.

[11] Patent Number: 6,014,017
[45] Date of Patent: Jan. 11, 2000

[54] METHOD AND APPARATUS FOR POWER FACTOR CORRECTION BY A COMPENSATION DEVICE HAVING A PULSE CONVERTER

[75] Inventors: Michael Weinhold, Erlangen; Rainer Zurowski, Forchheim; Martin Sonnenschein, Hattingen, all of Germany

[73] Assignee: Siemens Aktiengesellschaft, Munich, Germany

[21] Appl. No.: 09/292,272

[22] Filed: Apr. 15, 1999

Related U.S. Application Data

[63] Continuation of application No. PCT/DE97/02270, Oct. 2, 1997.

[30] Foreign Application Priority Data

Oct. 15, 1996 [DE] Germany .......................... 196 42 596

[51] Int. Cl.[7] .............................. G05F 1/70; H02M 5/45; H02M 1/12; H02M 5/20; H02J 1/02
[52] U.S. Cl. .............................. 323/207; 363/37; 363/39; 363/41; 363/163
[58] Field of Search ................................... 323/207, 205; 363/35, 37, 39, 41, 159, 164, 165, 163

[56] References Cited

U.S. PATENT DOCUMENTS

| | | | |
|---|---|---|---|
| 3,825,814 | 7/1974 | Pelly | 363/39 |
| 4,325,156 | 4/1982 | Gyugyi | 363/163 |
| 5,345,375 | 9/1994 | Mohan | 363/40 |
| 5,499,178 | 3/1996 | Mohan | 363/39 |
| 5,508,623 | 4/1996 | Heydt et al. | 324/623 |
| 5,548,165 | 8/1996 | Mohan et al. | 363/39 |

FOREIGN PATENT DOCUMENTS 42 15 550 A1  11/1993  Germany .......................... H02J 9/06

OTHER PUBLICATIONS

Richard Marschalko et al.: "Optical Control Appropriate Pulse Width Modulation for a Three–Phase Voltage dc–Link PWM Converter", 1992 IEEE Industry Applications Society Annual Meeting, vol. I, pp. 1042–1949, Oct. 9, 1992.

H. Akagi: "New Trends in Active Filters" EPE '95, pp. 17–26, Sep. 19, 1995.

D. Povh et al.: "Development of Facts for Distribution Systems" in XP–002054260.

*Primary Examiner*—Peter S. Wong
*Assistant Examiner*—Bao Q. Vu
*Attorney, Agent, or Firm*—Herbert L. Lerner; Laurence A. Greenberg

[57] ABSTRACT

A method and an apparatus for power factor correction for a non-ideal load, which is supplied from a mains power supply, by a compensation device which is electrically connected in parallel with the load and has a pulse converter with at least one capacitive store. A transfer function space vector is calculated as a function of a determined mains power supply voltage space vector, a mains power supply current space vector, a compensator current space vector and of an intermediate circuit voltage which is present on the capacitive store. As a result of which the pulse converter generates a compensator voltage space vector on the mains power supply side as a function of the intermediate circuit voltage. A compensator current space vector, that keeps the undesirable reactive current elements away from the mains power supply, is thus obtained via a coupling filter that is represented as a compensator inductance.

9 Claims, 7 Drawing Sheets

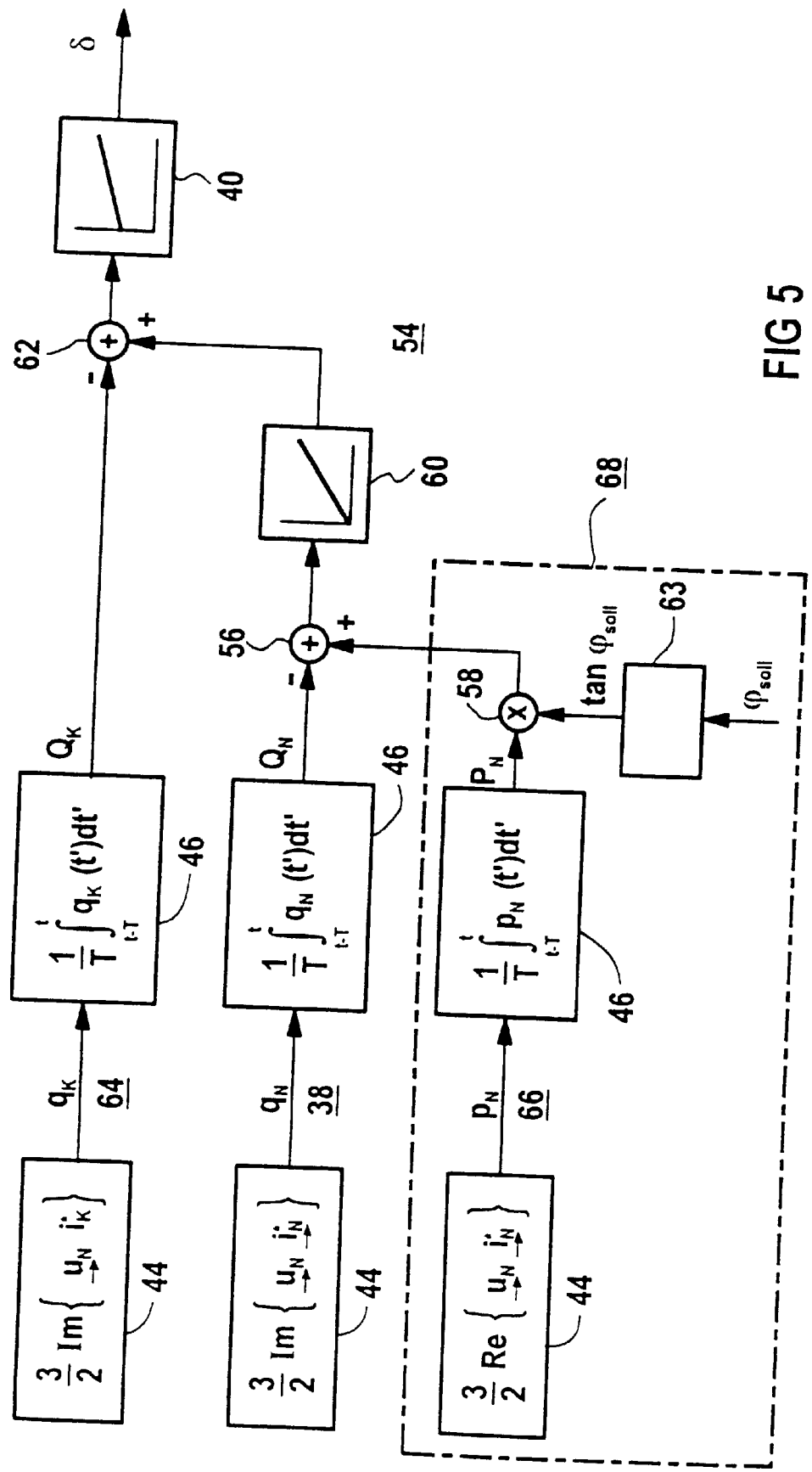

METHOD AND APPARATUS FOR POWER FACTOR CORRECTION BY A COMPENSATION DEVICE HAVING A PULSE CONVERTER

CROSS REFERENCE TO RELATED APPLICATION

This application is a continuation of International Application PCT/DE97/02270, filed Oct. 2, 1997, which designated the United States.

BACKGROUND OF THE INVENTION

1. Field of the Invention

The invention relates to a method and an apparatus for power factor correction for a non-ideal load that is supplied from a mains power supply by a compensation device. The compensation device is electrically connected in parallel with the load and has a pulse converter with at least one capacitive store, a matching filter and a regulating and control device.

A method and an apparatus for carrying out this method are known from the publication "Optimal Control and Appropriate Pulse Width Modulation for a Three-Phase Voltage dc-Link PWM Converter" by R. Marschalko and M. Weinhold, printed in the IEEE-IAS Conference Proceedings of the IAS Annual Meeting in Houston/Tex., October 1992.

The increasing use of non-linear loads (in particular diode rectifiers as are used, for example, in power supply units for PCs and televisions) in mains power supply systems is increasingly distorting the mains power supply voltage. Specifically, their currents have high harmonic levels and cause voltage drops across the mains power supply impedances which are superimposed on the originally sinusoidal mains power supply voltage. At excessively high levels, the voltage distortion can lead to overloading of the mains power supply equipment (for example transformers, compensation systems) and can interfere with correct operation of other loads.

Public electricity suppliers and international working groups have thus issued recommendations relating to the maximum permissible voltage distortion which a load may cause. So-called compatibility levels have been defined for individual harmonics in low-voltage mains power supplies. Equipment manufacturers must develop their products such that they still function without any interference at these distortion levels. The public electricity suppliers have to ensure that the compatibility levels in their mains power supply systems are not exceeded. However, the mains power supply voltage distortion in many mains power supply systems has already reached the compatibility level, and a further increase is expected.

A further problem in distribution networks is the VAr requirement of, for example, mains-commutated thyristor converters or asynchronous machines in industry, which depends on its operating point and thus in general varies. On the basis of contractual agreements with the public electricity supplier involved, the respective operator of such equipment often has to ensure that he maintains a specific power factor with respect to the point of common coupling to the higher-level network.

For example, single-phase modes cause an unbalanced load on the three-phase mains power supply. In terms of the mains power supply short-circuit rating, large loads cause load currents which result in large unbalanced mains power supply voltage drops across the mains power supply impedances. These can interfere with correct operation of the loads.

Large, short-term real power requirements from loads can result in an increased energy tariff price since the public electricity supplier involved makes a portion of the energy costs dependent on the maximum real power drawn during a given time interval (frequently one year). By using an energy store, which emits previously stored energy during this peak load time, the power peak can be capped, and the power price can be reduced. The use of energy stores can also avoid expensive mains power supply upgrading.

Until now, the problem of load current harmonics and the mains power supply voltage distortion caused by them has been solved by conventional filter circuits. Since the mid 1980's, active filters have also been used, based on control methods in both the time domain and the frequency domain. Various active filters were introduced in the Conference Report entitled "New Trends in Active Filters" by H. Akagi, printed in the Conference Proceedings of EPE' 95 in Seville, pages 17 to 26.

Compensation for VAr, or power factor correction, is nowadays normally still carried out conventionally using regulated compensator banks, with or without inductors. For a number of years, solutions with mains-commutated converters, so-called Static Var Compensators (SVC) and with self-commutating GTO or IGBT converters, so-called Static Condensers (STATCON) have also been used.

Such a compensation device with an IGBT pulse converter has been described in detail in the publication entitled "Development of FACTS for Distribution Systems" by D. Povh and M. Weinhold, printed in the Conference Proceedings of the EPRI Conference on the Future of Power Delivery, April 9–11, 1996. Such a compensation device is also called a Power Conditioner, in particular a Siemens Power Conditioner (SIPCON). Such a power conditioner has a pulse converter that is coupled to the mains power supply in parallel and via an LCL filter. The object of the LCL filter is to reduce the switching frequency feedback from the drive unit for pulse-width modulation. The converter used, which was developed for regulated-speed drives and has been manufactured in large quantities with ratings in the range from 2 kVA to 1.5 MVA, represents the basis of the SIPCON. The pulse converter contains insulated gate bipolar transistors (IGBT) and operates at switching frequencies up to 16 kHz. The power conditioner can be expanded by an energy store in order to bridge drops in the real power and to compensate for load fluctuations. The normal application is parallel coupling. This type of coupling is the most suitable for controlling voltage fluctuations resulting from VAr and for filtering low-order harmonics from a load. A further possibility is to connect the power conditioner in series. This application is advantageous if the load is intended to be supplied with an improved voltage quality or if transient mains power supply voltage fluctuations occur frequently.

The power conditioner control structure is configured such that it is possible to switch between three modes. On the input side, the regulator has a space vector transformation device with which a mains power supply current space vector, a conductor voltage space vector and a compensator current space vector are generated from measured mains power supply currents, conductor voltages and compensator currents. The space vectors are digitized and fed to a voltage regulator, power factor correction and a flicker regulator, it being possible to supply the outputs from these regulators via a changeover switch to a pulse-width modulator in the pulse converter.

If the voltage regulation mode is chosen, the mains power supply voltage space vector is compared with a reference value. A PI regulator then determines the VAr that is required to eliminate the voltage error. The output value from the VAr regulator is passed to the pulse-width modulator.

Load balancing has until now normally been carried out using Steinmetz circuits. These consist of reactive elements (capacitors and conductors) which are connected as required via switches or converters (for example three-phase controls).

Until now, energy stores have mainly been used as spare capacity for power station failures and frequency regulation. The Published, Non-Prosecuted German Patent Application No. 42 15 550 discloses a device for providing electrical energy from a DC store for an AC network, a superconductive magnetic energy store (SMES) with a very high storage efficiency being used as the DC store.

In the Conference Report (Houston) mentioned above, control methods are introduced so that the power conditioner can compensate for a fundamental shift VAr. In order to keep undesirable load reactive current elements away from the mains power supply, the compensation device must feed these elements in parallel to the load so that the current elements of the compensator at the point of common coupling (PCC) cancel out the load reactive current elements. The reactive current elements contained in the mains power supply current are first of all calculated from the mains power supply voltage and current space vectors, for this purpose. The difference between the compensator voltage space vector on the mains current side and the mains power supply voltage space vector must now be used to produce, via the coupling filter which is represented as a compensator inductance, a current space vector which keeps the undesirable reactive current elements away from the mains power supply and, in addition, supplies the DC circuit. The object of regulating the introduced power conditioner is to determine the transfer function space vector $\underline{u}$ (required to produce this voltage) between the intermediate circuit voltage of the pulse converter and the compensator voltage space vector on the mains power supply side.

The determined mains power supply voltage space vector and the determined complex-conjugate mains power supply current space vector are used to calculate the instantaneous VAr, which is supplied to a PI regulator whose output gives an angle value indicating the shift in angle between the mains power supply voltage space vector and the transfer function space vector. The angle and a unit space vector which points in the direction of the transfer function space vector as well as a constant amount are used to generate the transfer function space vector, which is supplied to the pulse-width modulator of the pulse converter. The pulse converter produces a compensator voltage space vector at its output on the mains power supply side as a function of the voltage across the capacitive store and of the transfer function space vector, and this compensator voltage space vector drives a compensation current via the inductance of its matching filter.

If the load now requires fundamental shift VAr, then this is initially drawn from the mains power supply. The occurrence of this VAr in the mains power supply changes, via the PI regulator, the angle between the mains power supply voltage space vector and the compensator voltage space vector on the mains power supply side. This leads to a compensator current space vector being formed that, inter alia, contains a real element. This leads to real power being interchanged between the mains power supply and the pulse converter intermediate circuit, and to a change in the intermediate circuit voltage. The angle and the intermediate circuit voltage now change until the fundamental shift VAr occurring in the mains power supply has disappeared. In the steady state, the angle is then once again equal to zero and the compensation device supplies exactly that fundamental shift VAr that the load requires. However, the intermediate circuit voltage has changed from that on no-load.

If it is assumed that the load requires inductive fundamental shift VAr, then the compensation device must emit capacitive VAr and the magnitude of the compensator voltage space vector on the mains power supply side is greater than the mains power supply voltage space vector. In consequence, the intermediate circuit voltage rises from that on no-load, and is set as a function of the operating point.

An ideal, three-phase mains power supply provides the load with three purely sinusoidal voltages at a constant frequency, which are shifted through 120° electrical with respect to one another and have constant, identical peak values. The ideal mains power supply currents for this network are proportional to the corresponding line-to-earth mains voltage in each phase, the proportionality factor being the same in all three phases. Specifically, a desired amount of energy or real power is then transmitted with the minimum collective root mean square current, and thus with the minimum possible load on the mains power supply. The currents are therefore called real currents. From the mains power supply point of view, such an ideal load acts like a three-phase, balanced, non-reactive resistor.

Every load whose behavior differs from this causes current elements which contribute nothing to real power transmission. These are called reactive currents. Subject to the precondition that the supply voltage corresponds approximately to the ideal case mentioned above, these reactive currents include the harmonic currents (including a DC element), whose frequencies are a multiple of the mains frequency, the fundamental shift reactive currents, which are caused by the phase shift between the mains power supply voltage fundamental and the mains power supply current fundamental, and the fundamental unbalance reactive currents, which are caused by unbalanced loads.

SUMMARY OF THE INVENTION

It is accordingly an object of the invention to provide a method and an apparatus for power factor correction by a compensation device having a pulse converter that overcome the above-mentioned disadvantages of the prior art methods and devices of this general type, which has a pulse converter, in such a manner that the compensation for the fundamental shift VAr in the mains power supply also takes account of the fundamental shift VAr of the compensator, and the mains power supply voltage can be regulated.

With the foregoing and other objects in view there is provided, in accordance with the invention, a method for power factor correction of a non-ideal load fed from a mains power supply, which includes: a) connecting electrically a compensation device in parallel with a load and the compensation device has a pulse converter with at least one capacitive store, a matching filter and a regulating and control device; b) determining a mains voltage space vector and a complex-conjugate mains current space vector from measured mains conductor voltages and mains currents of a mains power supply; c) determining a fundamental shift VAr of the mains power supply from the mains voltage space vector and the complex-conjugate mains current space vector; d) determining a transfer function space vector from the fundamental shift VAr and converting the transfer function space vector into control signals for the pulse converter; e)

generating a compensator voltage space vector as a function of the transfer function space vector and of an intermediate circuit voltage of the at least one capacitive store; f) determining a mains power supply real power from the mains voltage space vector and the complex-conjugate mains current space vector; g) determining a required value for the fundamental shift VAr by multiplying the mains power supply real power by a constant; h) determining a required value for a compensator VAr as a function of a comparison of an actual value and the required value of the fundamental shift VAr; i) determining the compensator VAr from the mains voltage space vector and from a complex-conjugate compensator current space vector; and j) determining a basic transfer function space vector from a determined control error in the compensator VAr.

In the steady state, the compensation device now supplies a fundamental shift VAr that is used to cover the fundamental shift VAr of the load and of the compensation device. In this case, the capacitive store is always supplied correctly, even if the compensation for the mains power supply fundamental shift VAr is suppressed. As a result of the fact that the real power in the mains power supply is calculated, it is possible to achieve a deliberate phase shift between the fundamental positive phase sequence systems of the mains power supply voltage space vector and the mains power supply current space vector. Therefore, the mains power supply voltage is regulated as a function of the calculated mains power supply real power and the predetermined phase shift.

This advantageous method makes it possible to compensate for reactive current elements which contain harmonic currents whose frequencies are a multiple of the mains power supply frequency and fundamental unbalance reactive currents which are caused by unbalanced loads.

In order to make it possible to compensate for the reactive current elements separately on the basis of individual harmonics and fundamental unbalances, a partial transfer function space vector is generated for each VAr type, and these are then added up with the basic transfer function space vector to form an overall transfer function space vector.

The identification of the fundamental unbalance and of the mains power supply current harmonics is based on a complex Fourier series development of the mains power supply current space vector. If the rotation frequency of the mains power supply voltage fundamental space vector is ω, then a vth order harmonic is initially identified by producing a unit space vector whose rotation frequency is +vω for a positive phase sequence system and −vω for a negative phase sequence system. The complex Fourier coefficient of the corresponding mains power supply current element is then determined from the product of the mains power supply current space vector and the complex conjugate unit space vector by averaging over one mains power supply cycle. The complex Fourier coefficient is supplied to an I-regulator, whose output signal is multiplied by a unit space vector. Depending on whether the system has a positive or negative phase sequence, a partial transfer function space vector is obtained after multiplication by an imaginary unit j or −j. The I-regulator is used to change the magnitude and the angle of the partial transfer function space vector until the corresponding harmonic in the mains power supply current is eliminated. In the steady state, the partial transfer function space vector, and thus the associated voltage part via the coupling inductance are at right angles to the compensation current element which compensates for the corresponding harmonic in the load current.

A partial transfer function space vector must be generated for each harmonic to be compensated for. In order to compensate for the fundamental unbalance, the output signal of the I-regulator is multiplied by a unit space vector with the rotation frequency ω and by the imaginary unit −j so that a partial transfer function space vector is generated which compensates for the unbalance.

Other features which are considered as characteristic for the invention are set forth in the appended claims.

Although the invention is illustrated and described herein as embodied in a method and an apparatus for power factor correction by a compensation device having a pulse converter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 5 is a block diagram of a regulation structure according to the invention;

DESCRIPTION OF THE PREFERRED EMBODIMENTS

Figure 1:
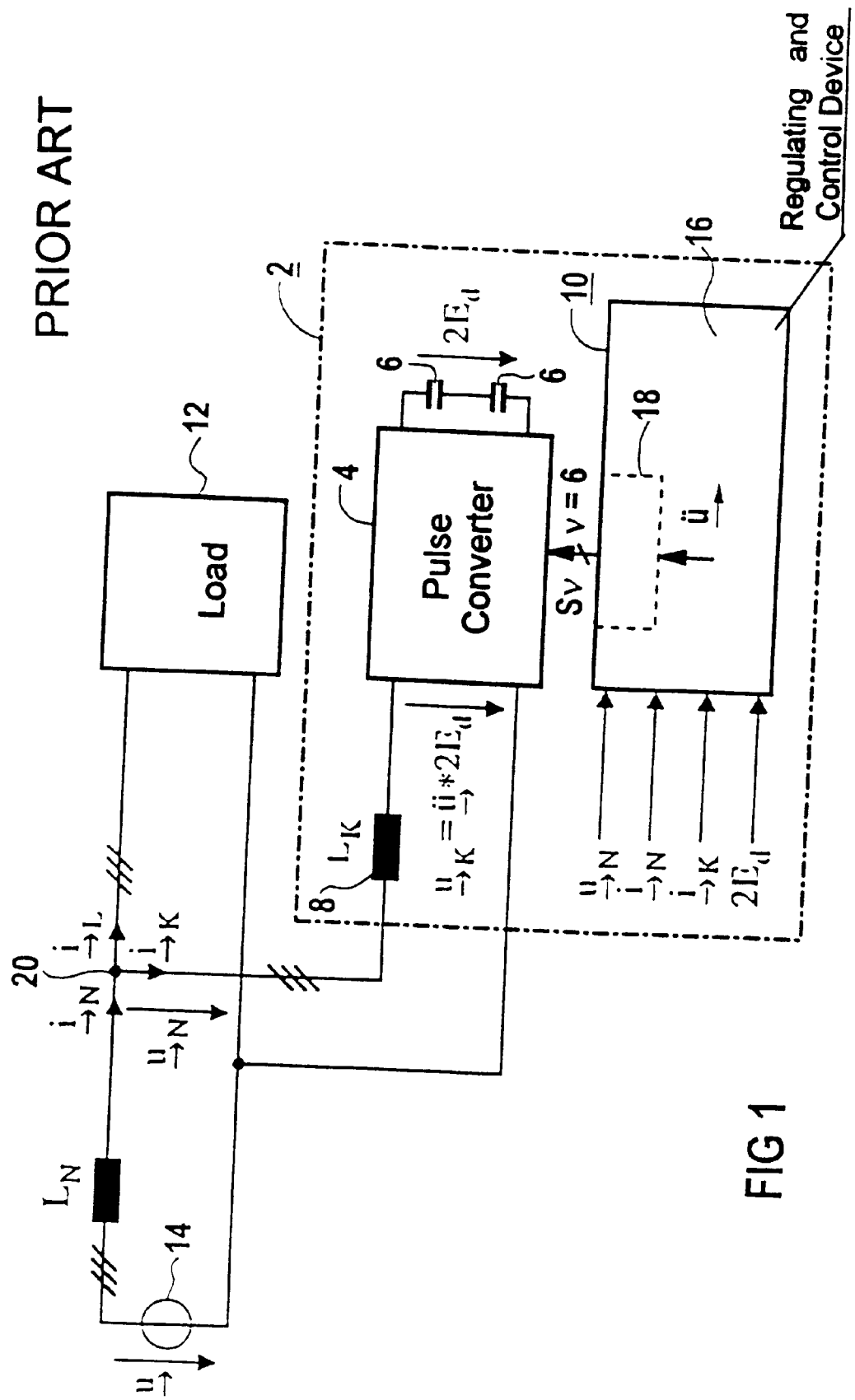
FIG. 1 is a diagrammatic block diagram of a known compensation device that has a pulse converter.

In all the figures of the drawing, sub-features and integral parts that correspond to one another bear the same reference symbol in each case. Referring now to the figures of the drawing in detail and first, particularly, to FIG. 1 thereof, there is shown a block diagram of a known compensation device 2, which was introduced in the Conference Report mentioned initially with the title "Optimal Control and Appropriate Pulse Width Modulation for a Three-Phase Voltage dc-link PWM Converter", and whose method of operation has been described in detail. The compensation device 2 has a pulse converter 4 with at least one capacitive store 6, a matching filter 8 and a regulating and control device 10. The compensation device 2 is connected electrically in parallel with a non-ideal load 12 that is supplied from a mains power supply 14. The regulating and control device 10 is supplied with a mains power supply voltage space vector $\underline{u}_N$, a mains power supply current space vector $\underline{i}_N$, a compensator current space vector $\underline{i}_K$ and an intermediate circuit voltage $2E_d$ which is dropped across the two capacitive stores 6 of the pulse converter 4. The space vector $\underline{u}_N$, $\underline{i}_N$ and $\underline{i}_K$ are generated by a space vector transformation device from measured conductor voltages, mains power supply currents and compensator currents. Since the device is known from the Conference Report mentioned initially and entitled "Development of FACTS for Distribution Systems", only the essential parts of the compensation device 2 are illustrated in this representation. In this case, the matching filter 8 has been replaced by an inductance $L_K$ in the illustration while, in contrast, in the Conference Report, the matching filter 8 is illustrated in detail.

The regulating and control device 10 has a regulating device 16 for determining a transfer function space vector $\underline{u}$, and a pulse-width modulator 18, which is illustrated by an interrupted line. The transfer function space vector $\underline{u}$ is a manipulated variable of the pulse converter 4, which is converted by the pulse-width modulator 18 into control signals $S_v$ for the pulse converter 4. The configuration of the regulator device 16 is illustrated in more detail in FIG. 2.

Since the load 12 is not envisaged to be an ideal load, the non-ideal load 12 causes current elements that contribute nothing to real power transmission. These are called reactive currents. Subject to the precondition that the supply voltages are approximately purely sinusoidal voltages at a constant frequency that are shifted through 120° electrical with respect to one another and have constant, identical peak values, the reactive currents contain the harmonic currents (including a DC element) whose frequencies are a multiple of the mains power supply frequency, the fundamental shift reactive currents which are caused by the phase shift between the mains power supply voltage fundamental and the mains power supply current fundamental, and the fundamental unbalance reactive currents, which are caused by unbalanced loads.

In order to keep undesirable reactive currents from the load 12 away from the mains power supply 14, the compensation device 2 must supply these elements in parallel to the load 12, so that the current elements of the compensation device 2 at the point of common coupling 20 cancel out the reactive current elements from the load 12. For this purpose, the reactive current elements contained in the mains power supply current $\underline{i}_N$, must first be calculated from the mains power supply voltage and current space vectors $\underline{u}_N$ and $\underline{i}_N$. The difference determined between the compensator voltage space vector $\underline{u}_K$ on the mains power supply side and the mains power supply voltage space vector $\underline{u}_N$ produces, via the matching filter 8 which is illustrated as a compensator inductance $L_K$, a compensation current space vector $\underline{i}_K$ which keeps the undesirable reactive current elements away from the mains power supply 14 and also supplies the capacitive stores 6. The object of the regulating and control device 10 is to determine the transfer function space vector $\underline{u}$, which is required to produce this voltage, between the intermediate circuit voltage $2E_d$ and the compensator voltage space vector $\underline{u}_K$ on the mains power supply side.

Figure 2:
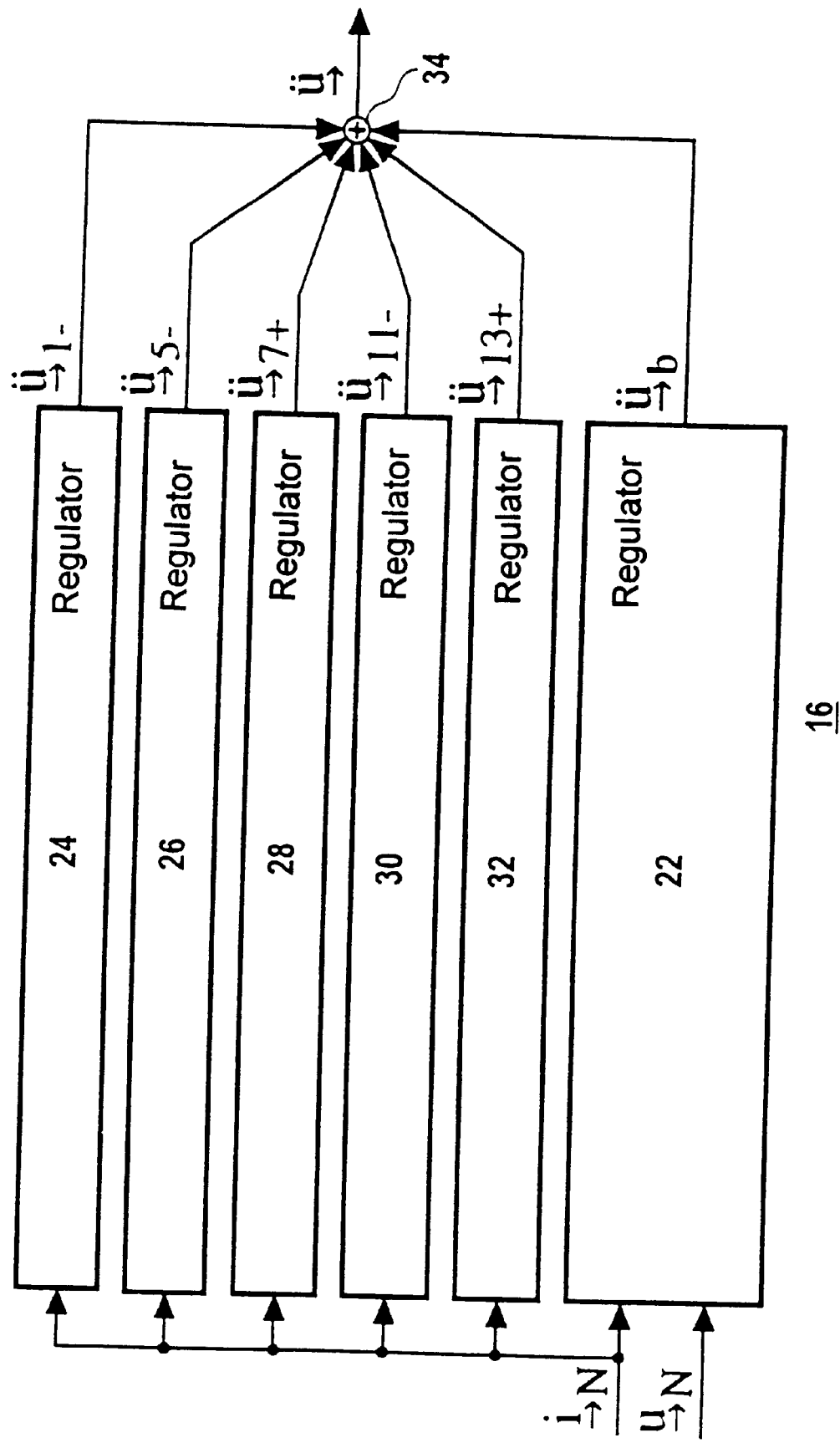
FIG. 2 is a block diagram of a regulator for generating an overall transfer function space vector.
Figure 6:
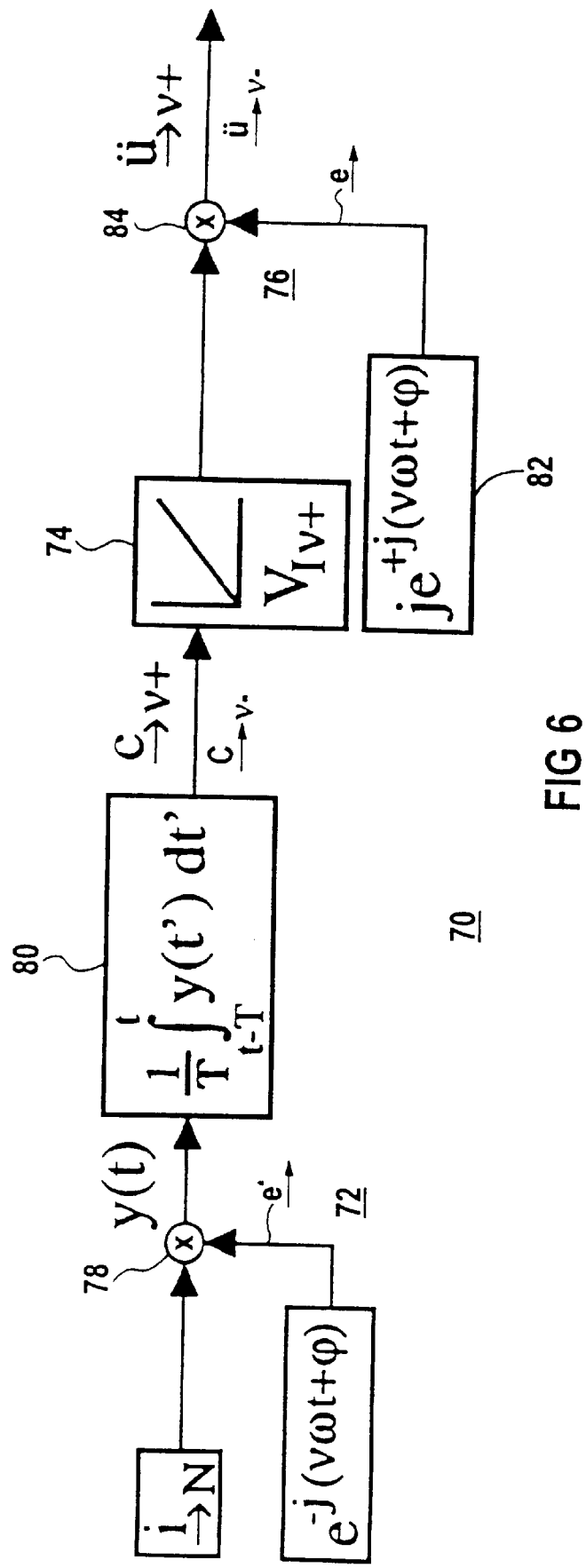
FIG. 6 is a block diagram showing the regulation structure for generating a partial transfer function space vector.
Figure 8:
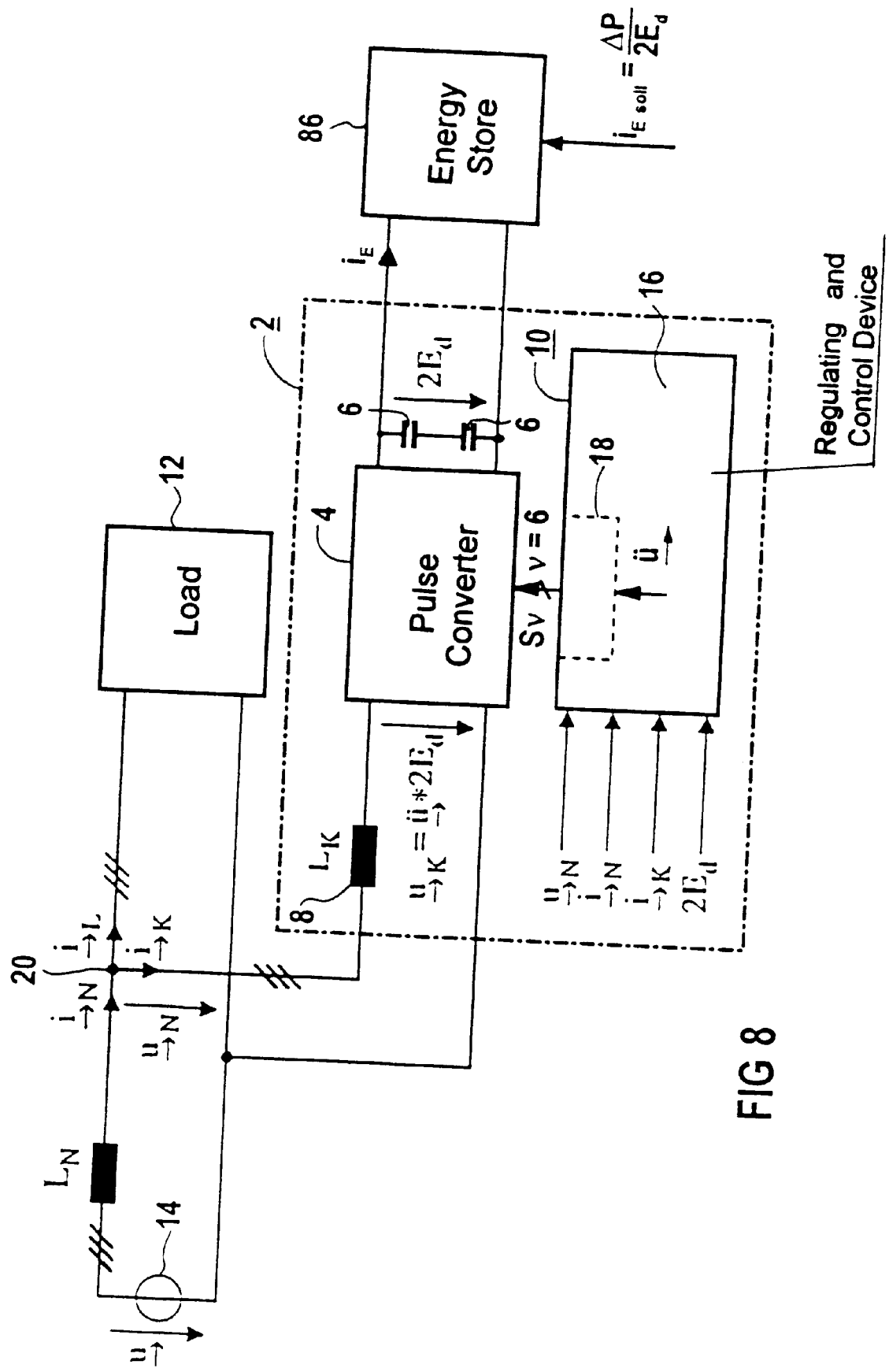
FIG. 8 is a block diagram of an advantageous embodiment of a compensation device according to FIG. 1.

In order to make it possible to compensate for the reactive elements separately on the basis of individual harmonics, fundamental shift VAr and fundamental unbalances, the regulating and control device 10 according to FIG. 2 has a regulator 22, 24, 26, 28, 30 and 32 for each type of VAr and for each harmonic, whose outputs are linked to a summation point 34. The configuration of the regulator 22 is illustrated partly in FIG. 3 and partly in FIG. 5 while, in contrast, the regulators 24, 26, 28, 30 and 32 are illustrated in more detail by a representative regulator structure in FIG. 6. The regulator 22 is supplied with the determined mains power supply voltage space vector $\underline{u}_N$ and the determined mains power supply current space vector $\underline{i}_N$ while, in contrast, the regulators 24, . . . , 32 are supplied only with the mains power supply current space vector $\underline{i}_N$. Each regulator 22, . . . , 32 uses its input signals to calculate a partial transfer function space vector $\underline{u}_b$, $\underline{u}_{1-}$, $\underline{u}_{5-}$, $\underline{u}_{7+}$, $\underline{u}_{11-}$ and $\underline{u}_{13+}$ from which an overall transfer function space vector $\underline{u}$ is formed by the summation point 34.

The regulator 22 calculates, as the partial transfer function space vector, the basic transfer function space vector $\underline{u}_b$ to compensate for the fundamental shift VAr and to supply the capacitive stores 6 of the pulse converter 4. The regulators 24 to 32 each calculate, as the partial transfer function space vector, a partial transfer function space vector $\underline{u}_{v+1-}$ to compensate for mains power supply harmonics and mains power supply current unbalances. In the block diagram according to FIG. 2, the regulating device 16 of the regulating and control device 10 has regulators 26, 28, 30 and 32 to compensate for the four major harmonics of a six-pulse thyristor bridge, the regulator 22 to compensate for fundamental shift VAr, and the regulator 24 to compensate for any fundamental unbalance.

Figure 3:
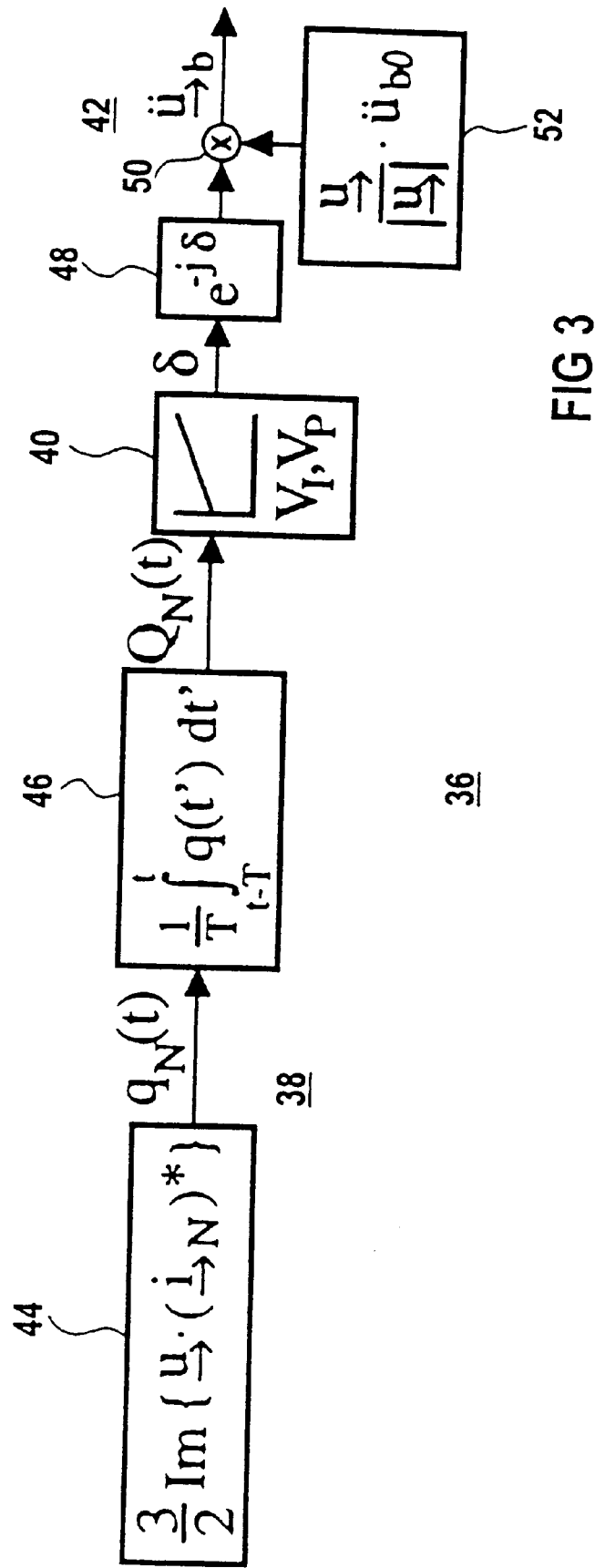
FIG. 3 is a block diagram of a known regulation structure for generating a basic transfer function space vector.
Figure 4:
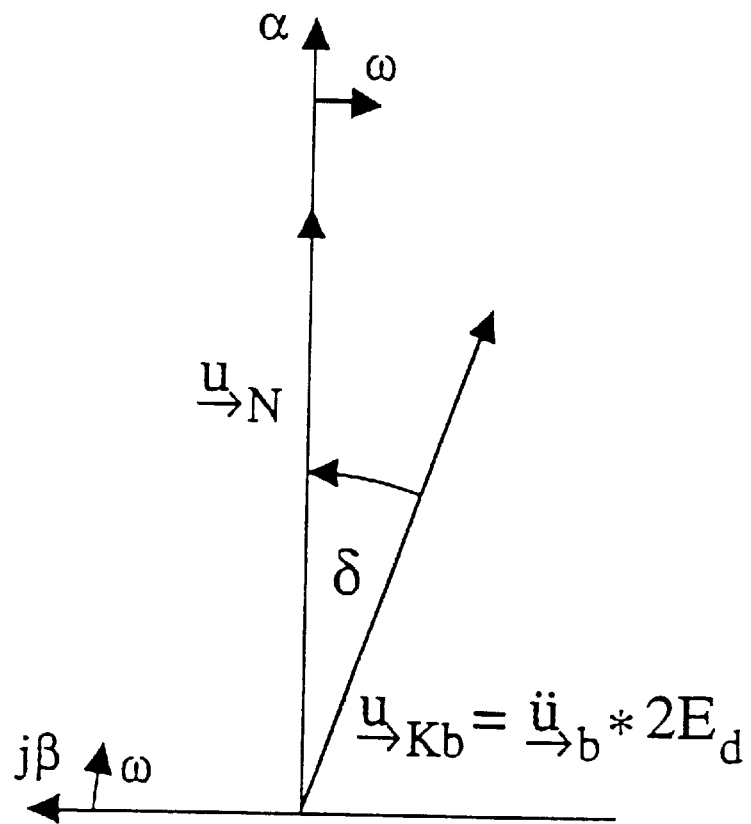
FIG. 4 is a graph of an associated vector diagram in a complex plane.

FIG. 3 shows a first part 36 of the regulator 22, which is already known from the Conference Report (Houston) mentioned initially. The first part 36 of the regulator 22 has a device 38 for determining a fundamental shift VAr $Q_N$, a PI-regulator 40 and a device 42 for forming a basic transfer function space vector $\underline{u}_b$. The device 38 for determining a fundamental shift VAr $Q_N$ has an arithmetic device 44 for determining an instantaneous VAr $q_N$, also called transverse VAr, and a downstream averaging device 46. The averaging device 46 forms the mean value of the transverse VAr $q_N$ over one mains power supply cycle. The transverse VAr $q_N$ is calculated by the arithmetic device 44 from the mains power supply voltage space vector $\underline{u}_N$ and the complex-conjugate mains power supply current space vector $\underline{i}_{N^*}$. The fundamental shift VAr $Q_N$ which is present at the output of the averaging device 46 is supplied to the PI-regulator 40, whose output variable is an angle δ which is between the mains power supply voltage space vector $\underline{u}_N$ and the basic transfer function space vector $\underline{u}_b$ (FIG. 4). The angle δ is present at the input of the device 42 for forming a basic transfer function space vector $\underline{u}_b$. The device 42 has a function generator 48 at whose output the function $e^{-j\delta}$ is present which is multiplied, by a multiplier 50, by the output signal from a further function generator 52. The further function generator 52 forms a unit space vector in the direction of the basic transfer function space vector $\underline{u}_b$, which is multiplied by an amount $\underline{u}_{bo}$. Since the magnitude of the overall transfer function space vector $\underline{u}$ is limited, the amount $\underline{u}_{bo}$ must be chosen such that there is still sufficient control margin for the remaining partial transfer function space vectors $\underline{u}_{v+1-}$ and $\underline{u}_1$ to compensate for the harmonics and the fundamental unbalance. The angle of the basic part of the compensator voltage space vector $\underline{u}_{Kb}$ on the mains power supply side is thus equal to the mains power supply voltage angle less the angle δ, and the magnitude of the compensator voltage space vector $\underline{u}_{Kb}$ depends on the intermediate circuit voltage $2E_d$ (FIG. 4).

If it is first of all assumed that the load 12 does not absorb any fundamental shift VAr $Q_N$, then the mains power supply voltage space vector $\underline{u}_N$ and the basic part of the compensator voltage space vector $\underline{u}_{Kb}$ on the mains power supply side are identical. The angle δ is thus equal to zero and the magnitude of the intermediate circuit voltage is $2E_d=|\underline{u}_N/\underline{\ddot{u}}_{bo}|$. The associated element of the compensator current space vector $\underline{i}_K$ is likewise zero.

If the load 12 now requires the fundamental shift VAr $Q_N$, then this is initially drawn from the mains power supply 14. The occurrence of the VAr $Q_N$ in the mains power supply changes, via the PI regulator 40, the angle δ between the mains power supply voltage space vector $\underline{u}_N$ and the basic part of the compensator voltage space vector $\underline{u}_{Kb}$ on the mains power supply side. This leads to a compensator current space vector $\underline{i}_k$ being set up which, inter alia, includes a real element. This results in real power being interchanged between the mains power supply 14 and the capacitive store 6, as a result of which the intermediate circuit voltage $2E_d$ changes. The angle δ and the intermediate circuit voltage $2E_d$ now change only until the fundamental shift VAr $Q_N$ that has occurred in the mains power supply 14 disappears. In the steady state, the angle δ is then equal to zero again, and the compensation device 2 supplies exactly that fundamental shift VAr $Q_N$ that the load 12 requires.

However, the intermediate circuit voltage $2E_d$ has changed from that in the no-load case. If it is assumed that the load 12 requires inductive fundamental shift VAr $Q_N$, then the compensation device 2 has to emit capacitive VAr and the compensator voltage space vector $\underline{u}_K$ on the mains power supply side is considerably greater than the mains power supply voltage space vector. The intermediate circuit voltage $2E_d$ thus rises in comparison with the no-load case and is set as a function of the operating point. The control loop therefore simultaneously ensures that the DC intermediate circuit is supplied correctly since any discrepancy between the intermediate circuit voltage $2E_d$ and the value based on its operating point necessarily leads to the occurrence of fundamental shift VAr.

FIG. 5 illustrates a second part 54 of the regulator 22 of the regulating device 16, parts of the first part 36 of the regulator 22 also being illustrated in order that it is possible to see how these two parts 36 and 54 of the regulator 22 are interleaved. The device 38 for determining the fundamental shift VAr $Q_N$ is linked on the output side to the inverting input of a comparator 56, whose non-inverting input is linked to the output of a multiplier 58 and whose output is linked to an I regulator 60. On the output side, the I-regulator 60 is linked to a non-inverting input of a further comparator 62, whose output is connected to the PI regulator 40 of the first part 36 of the regulator 22, and whose inverting input is connected to an output of a device 64 for determining a compensator VAr $Q_K$. The inputs of the multiplier 58 are linked on the one hand to a constant element 63 and on the other hand to a device 66 for determining a real power PN. The device 66, the multiplier 58 and the constant element 63 together form a required value forming device 68 at whose output a required value of the fundamental shift VAr $Q_N$ is present. The devices 64 and 66 each have the arithmetic device 44 with the downstream averaging device 46, the device 64 being supplied with a mains power supply voltage space vector $\underline{u}_N$ and a complex-conjugate compensator current space vector $\underline{i}_{K^*}$, and the device 66 being supplied with a mains power supply voltage space vector $\underline{u}_N$ and a complex-conjugate mains power supply current space vector $\underline{i}_{N^*}$.

In addition to the fundamental shift VAr $Q_N$ which occurs in the mains power supply 14, the second part 54 of the regulator 22 is also used to calculate the real power $P_N$ in the mains power supply 14 and the fundamental shift VAr $Q_K$ of the compensation device 2. In this way, if necessary, it is possible to achieve a deliberate phase shift $\phi_{soll}$, which is present as the input signal at the constant element 63, between the positive phase sequence fundamental systems of the mains power supply voltage space vector $\underline{u}_N$ and the mains power supply current space vector $\underline{i}_N$, for example in order to carry out the mains power supply voltage regulation. For this purpose, the mains power supply real power $P_N$ is multiplied by the constant tan $\phi_{soll}$ and is compared, as the required value of the fundamental shift VAr $Q_N$ with the actual value of the fundamental shift VAr $Q_N$. The control error is then processed by the I-regulator 60. The output signal from the I-regulator 60 is compared, as the required value of the compensator VAr $Q_K$, with the actual value of the compensator VAr $Q_K$, and the control error determined is supplied to the PI regulator 40 in the first part 36 of the regulator 22.

The regulator 22 is used to generate a basic transfer function space vector $\underline{\ddot{u}}_b$, with which it is possible to compensate not only for the fundamental shift VAr $Q_N$ of the mains power supply 14, but also for the fundamental shift VAr $Q_K$ of the compensation device 2. If it is not intended to compensate for the fundamental shift VAr $Q_N$ of the mains power supply 14, then the control gain of the I-regulator 60 is set to zero. Even in this case, the capacitive stores 6 in the pulse converter 4 would be supplied correctly.

The regulators 24, 26, 28, 30 and 32, which generate partial transfer function space vectors $\underline{\ddot{u}}_{1-}$, $\underline{\ddot{u}}_{5-}$, $\underline{\ddot{u}}_{7+}$, $\underline{\ddot{u}}_{11-}$ and $\underline{\ddot{u}}_{13+}$, differ by the order numbers ν of the harmonics and depending on whether they occur in a positive phase sequence (+) or negative phase sequence (−) system. A generalized regulator structure 70 is therefore illustrated in more detail in FIG. 6, as being representative of the regulators 24, . . . , 32.

Figure 7:
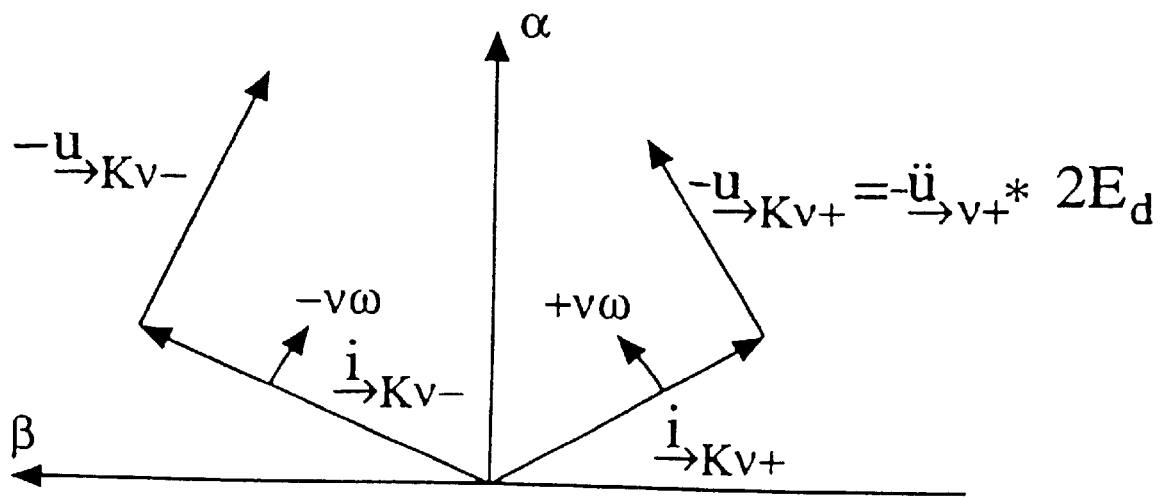
FIG. 7 is a graph of an associated vector diagram in the complex plane.

The regulator structure 70 has a device 72 on the input side for forming a complex Fourier coefficient $\underline{c}_{v+}$ or $\underline{c}_{v-}$, downstream of which a PI regulator 74 is connected. On the output side, the PI regulator 74 is linked to a device 76 for forming a partial transfer function space vector $\underline{\ddot{u}}_{v+}$ or $\underline{\ddot{u}}_{v-}$. The device 72 has a multiplier 78 with a downstream averaging device 80, one input of the multiplier 78 being connected to an output of a unit space vector forming device 82. A mains power supply current space vector $\underline{i}_N$ is present at the second input of this multiplier 78. A complex Fourier coefficient $\underline{c}_{v+}$ or $\underline{c}_{v-}$ is produced by the averaging device 80 with respect to one mains power supply cycle from the product y(t) which is present at the output of the multiplier 78, v being the order number of the harmonic to be compensated for, and + or − designating a positive phase sequence or negative phase sequence system, respectively. The complex-conjugate unit space vector $\underline{e}^*$ rotates at a rotation frequency +vω in the positive phase sequence system and at a rotation frequency −vω in the negative phase sequence system, ω being the rotation frequency of the mains power supply voltage fundamental space vector. The complex Fourier coefficient $\underline{c}_{v+}$ or $\underline{c}_{v-}$ of the corresponding mains power supply current element is produced by averaging over the mains power supply cycle from the product y(t) of the mains power supply current space vector $\underline{i}_N$ and complex-conjugate unit space vector $\underline{e}^*$. The output signal of the I-regulator 74 is multiplied, by a further multiplier 84, by the unit space vector $\underline{e}$ and by an imaginary unit j or −j, respectively. The product of the multiplication is a partial transfer function space vector $\underline{\ddot{u}}_{v+}$ or $\underline{\ddot{u}}_{v-}$. The I-regulator 74 then changes the magnitude and the angle of the partial transfer function space vector $\underline{\ddot{u}}_{v+}$ or $\underline{\ddot{u}}_{v-}$ until the corresponding vth order harmonic is eliminated in the mains power supply current. In the steady state, the partial transfer function space vector $\underline{\ddot{u}}_{v+}$ or $\underline{\ddot{u}}_{v-}$, and thus the associated voltage element $\underline{\ddot{u}}_{Kv+}$ or $\underline{\ddot{u}}_{Kv-}$ of the compensator voltage space vector $\underline{u}_K$ is at right angles to the compensator current element space vector $\underline{i}_{Kv+}$ or $\underline{i}_{Kv-}$, which compensates for the corresponding vth order harmonic in the load current $\underline{i}_L$ (FIG. 7). A regulator 26, . . . , 32 must be provided for each harmonic to be compensated. A negative phase sequence system regulator of order v=1 must be provided to compensate for the fundamental unbalance (regulator 24).

If it is intended that the compensation device 2 should influence the real power $P_N$ supplied from the mains power supply 14, then the compensation device 2, which is connected in parallel with the load 12, must be able to absorb or emit real power $P_N$. For this purpose, an additional energy store 86 must be coupled to the DC intermediate circuit of the pulse converter 4, which stores or emits the difference ΔP between the mains power supply power and the load power which is passed via the compensation device 2. The energy store 86 must be supplied with a regulated current, that is to say it must be able to take a defined direct current $i_E$ from the intermediate circuit of the compensation device 2 on the basis of a required current value signal $i_{Esoll}$. The required current value $i_{Ereq}$ is calculated from the power difference ΔP to be applied and the intermediate circuit voltage $2E_d$ of the compensation device 2. If it is intended to take real power $P_N$ from the mains power supply 14, then the required current value signal $i_{Ereq}$ must be positive. The energy store 86 will then take energy from the intermediate circuit of the pulse converter 4. This leads to a reduction in the intermediate circuit voltage $2E_d$. The basic part of the compensator voltage space vector $\underline{u}_{Kb}$ on the mains power supply side falls, and the fundamental shift VAr $Q_N$ changes. The fundamental shift VAr $Q_N$ is compensated for by the first part 36 of the regulator 22 in that the angle δ between the mains power supply voltage space vector $\underline{u}_N$ and the basic part of the compensator voltage space vector $\underline{u}_{Kb}$ opens.

The real power flow resulting from this into the intermediate circuit of the pulse converter 4 allows the intermediate circuit voltage $2E_d$, and thus the basic part of the compensator voltage space vector $\underline{u}_{Kb}$, to rise again. Since the energy store 86 now, however, continuously draws the power $\Delta P = 2E_d \cdot i_{Esoll}$ from the intermediate circuit, the angle δ is not equal to zero after compensation for the mains power supply shift VAr $Q_N$, but that angle necessary to supply the power (taken from the energy store 86) for the compensation device 2 from the mains power supply 14 remains.

The energy store 86 has a DC store and a control element with an associated drive unit in order that it is possible to set the required current value $i_{Esoll}$. A superconductive magnetic energy store (SMES) may be used, for example, as the DC store. Other energy stores, such as flywheel stores or batteries, can also be used as DC stores.

We claim:

1. A method for power factor correction of a non-ideal load fed from a mains power supply, which comprises:
   a) connecting electrically a compensation device in parallel with a load and the compensation device having a pulse converter with at least one capacitive store, a matching filter and a regulating and control device;
   b) determining a mains voltage space vector and a complex-conjugate mains current space vector from measured mains conductor voltages and mains currents of a mains power supply;
   c) determining a fundamental shift VAr of the mains power supply from the mains voltage space vector and the complex-conjugate mains current space vector;
   d) determining a transfer function space vector from the fundamental shift VAr and converting the transfer function space vector into control signals for the pulse converter;
   e) generating a compensator voltage space vector as a function of the transfer function space vector and of an intermediate circuit voltage of the at least one capacitive store;
   f) determining a mains power supply real power from the mains voltage space vector and the complex-conjugate mains current space vector;
   g) determining a required value for the fundamental shift VAr by multiplying the mains power supply real power by a constant;
   h) determining a required value for a compensator VAr as a function of a comparison of an actual value and the required value of the fundamental shift VAr;
   i) determining the compensator VAr from the mains voltage space vector and from a complex-conjugate compensator current space vector; and
   j) determining a basic transfer function space vector from a determined control error in the compensator VAr.

2. The method according to claim 1, which comprises:
   k) determining a complex Fourier coefficient from a product of a mains power supply current space vector and a complex-conjugate unit space vector;
   l) determining a partial transfer function space vector as a function of the complex Fourier coefficient, a unit space vector and of an imaginary unit; and
   m) adding vectorially the basic transfer function space vector and the partial transfer function space vector.

3. An apparatus for power factor correction of a non-ideal load supplied by a mains power supply, comprising:
   a compensation device having a pulse converter with at least one capacitive store, a matching filter connected to said pulse converter and a regulating and control device connected to said pulse converter, said regulating and control device having a regulator device for determining a transfer function space vector and a pulse-width modulator with outputs outputting control signals received by said pulse converter, said regulator device having a device with an output side for determining a fundamental shift VAr, a PI regulator having an input, and a device for forming a basic transfer function space vector connected to said PI regulator;

a comparator having an inverting input connected to said output side of said device for determining the fundamental shift VAr, a non-inverting input and an output;

a required value forming device for the fundamental shift VAr, said required value forming device having an output connected to said non-inverting input of said comparator and inputs receiving a determined mains power supply voltage space vector, a determined complex-conjugate mains power supply current space vector, and a phase angle;

an I-regulator connected to said output of said comparator and having an output;

a further comparator having an output connected to said PI regulator, an inverting input and a non-inverting input connected to said output of said I-regulator; and a device for determining a compensator VAr having inputs and an output connected to said inverting input of said further comparator, said inputs of said device for determining the compensator VAr receiving the determined mains power supply voltage space vector and a determined complex-conjugate compensator current space vector.

4. The apparatus according to claim 3, wherein said regulator device has a regulator with an output for determining the basic transfer function space vector and n further regulators with outputs for determining n partial transfer function space vectors, each of said n further regulators having a device for forming a complex Fourier coefficient, a further I regulator and a device for forming a partial transfer function space vector connected to said I regulator, and including a summation point having a first input connected to said output of said regulator for determining the basic transfer function space vector and said outputs of said n further regulators linked to said summation point.

5. The apparatus according to claim 4, wherein said device for forming the complex Fourier coefficient has a multiplier with inputs and a downstream averaging device connected to said multiplier, and including a unit space vector forming device having an output connected to one of said inputs of said multiplier.

6. The apparatus according to claim 4, wherein said device for forming the partial transfer function space vector has a unit space vector forming device and a multiplier having inputs connected to said further I-regulator and said unit space vector forming device.

7. The apparatus according to claim 3, wherein said required value forming device for the fundamental shift VAr has an arithmetic device with an output for determining an instantaneous real power, an averaging device having an input connected to said output of said arithmetic device and an output, a constant element having an output, and a multiplier having inputs connected to said output of said constant element and said output of said averaging device.

8. The apparatus according to claim 3, wherein said device for determining the compensator VAr has an arithmetic device for determining an instantaneous VAr and a downstream averaging device connected to said arithmetic device.

9. The apparatus according to claim 4, wherein said regulator is a signal processor.

* * * * *